(12) United States Patent
Han

(10) Patent No.: US 7,408,767 B2
(45) Date of Patent: Aug. 5, 2008

(54) FIXING MECHANISM FOR STORAGE DEVICE

(75) Inventor: Shao-Bo Han, Shenzen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 239 days.

(21) Appl. No.: 11/316,586

(22) Filed: Dec. 21, 2005

(65) Prior Publication Data

US 2006/0193111 A1    Aug. 31, 2006

(30) Foreign Application Priority Data

Dec. 30, 2004    (CN)    .................... 2004 2 0103596 U

(51) Int. Cl.
*H05K 7/12*    (2006.01)
(52) U.S. Cl. ............... 361/684; 361/727; 312/223.2
(58) Field of Classification Search ............. 361/684, 361/727; 312/223.2
See application file for complete search history.

(56) References Cited

U.S. PATENT DOCUMENTS

| 5,683,159 | A | 11/1997 | Johnson |
| 6,543,866 | B2 * | 4/2003 | Chen et al. ................ 312/223.2 |
| 6,935,604 | B2 * | 8/2005 | Chen .......................... 248/694 |

* cited by examiner

*Primary Examiner*—Jayprakash N Gandhi
*Assistant Examiner*—Ingrid Wright
(74) *Attorney, Agent, or Firm*—Morris Manning Martin LLP; Tim Tingkang Xia, Esq.

(57) ABSTRACT

A fixing mechanism includes a bracket (10) for receiving a storage device (70), a latch member (30) and a fastener (50). The bracket includes a sidewall (12), and the sidewall defines spaced first and second sets of holes (125, 127) therein. The latch member includes a plurality of latches (361), the latches being extended through the first set of holes for engaging the storage device at a first position. The fastener detachably attaches the latch member to the sidewall, and the latches are extended through the second set of holes for engaging the storage device at a second position with the precondition that the latch member is turned around an axis defined by the fastener.

12 Claims, 6 Drawing Sheets

FIXING MECHANISM FOR STORAGE DEVICE

BACKGROUND OF THE INVENTION

1. Field of the Invention

The present invention relates to a fixing mechanism, and more particularly to a fixing mechanism for a storage device.

2. General Background

The manufacture and assembly of electronic apparatuses has become increasingly more competitive. Manufacturers continually strive to improve the design and features of electronic apparatuses yet still offer competitive prices. One such area of improvement is mounting of internal devices in an electronic apparatus. An electronic apparatus, such as a typical desktop computer, tower, server, and the like, usually include storage devices, such as hard disk drives, compact disk read-only memory (CD-ROM) drives, digital video disc (DVD) drives, floppy disk drives, and the like. These devices are typically added to increase the functionality of the electronic apparatus as desired by a user.

U.S. Pat. No. 5,683,159 teaches one typical mounting apparatus for mounting internal devices inside a computer case. The mounting apparatus includes a pair of slide rails. Each slide rail includes a biased mounting post which selectively mates with matching mounting holes in each side of the internal device. As the internal device is slid inside the computer case, the biased mounting post of each slide rail protrudes into one mounting hole of corresponding side of the internal device to reversibly affix the internal device to the computer case. However, the internal device together with the slide rails has to be withdrawn from the computer case, and then make the biased mounting post of each slide rail protrude into another mounting hole of the corresponding side of the internal device when it is desired to change the mounting positions of the internal device.

What is desired, therefore, is a fixing mechanism which can change mounting positions of an internal device without withdrawing the internal device in advance.

SUMMARY

In one preferred embodiment, a fixing mechanism includes a bracket for receiving a storage device, the bracket including a sidewall, spaced first and second sets of holes being defined in the sidewall; a latch member including a plurality of latches, the latches being extended through the first set of holes for engaging the storage device at a first position; and a fastener detachably attaching the latch member to the sidewall, the latches being extended through the second set of holes for engaging the storage device at a second position with the precondition that the latch member is turned 180 degrees around the fastener.

Other advantages and novel features will become more apparent from the following detailed description of a preferred embodiment when taken in conjunction with the accompanying drawings, in which:

DETAILED DESCRIPTION OF THE EMBODIMENT

Figure 1:
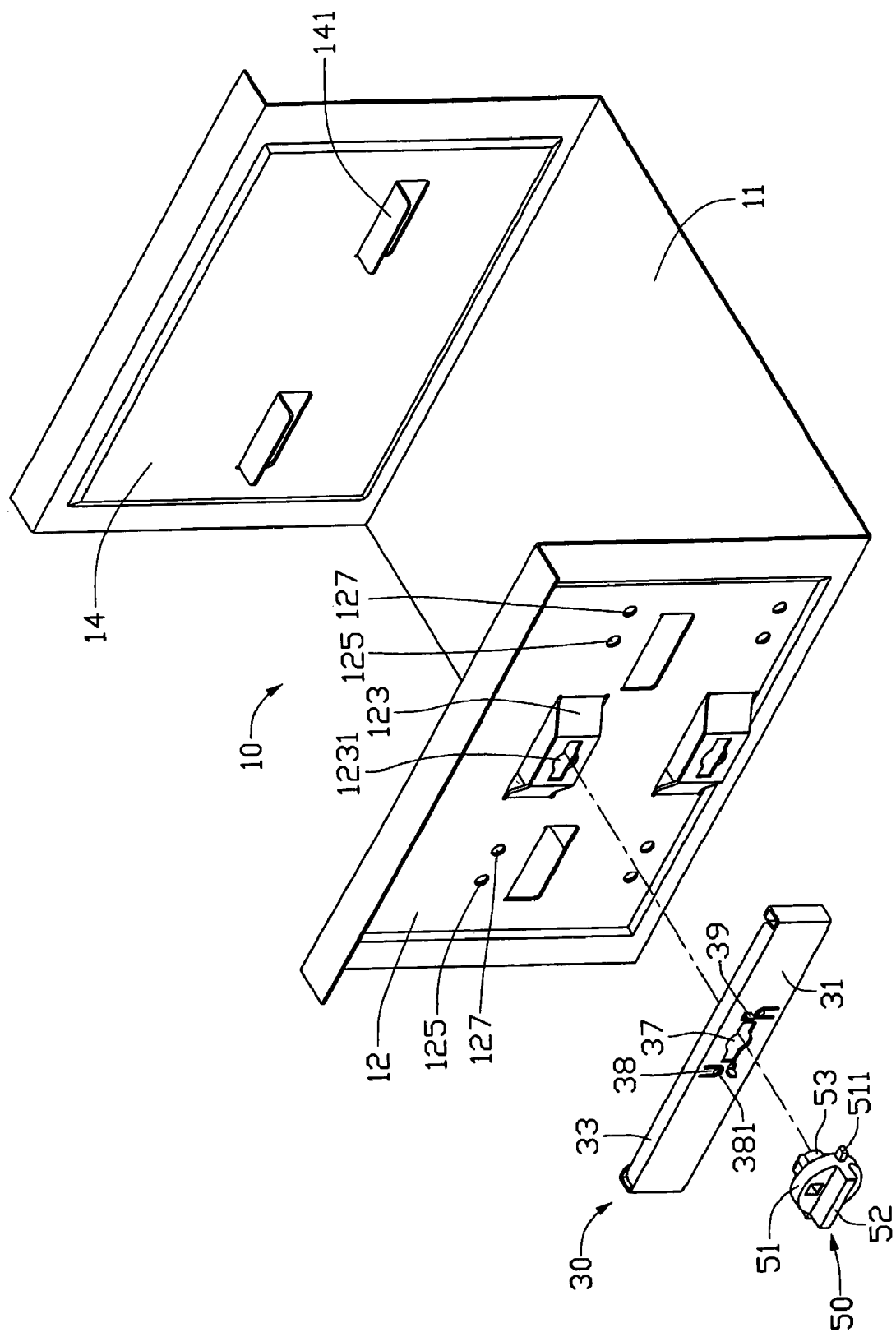
FIG. 1 is an exploded, isometric view of a fixing mechanism in accordance with a preferred embodiment of the present invention.
Figure 2:
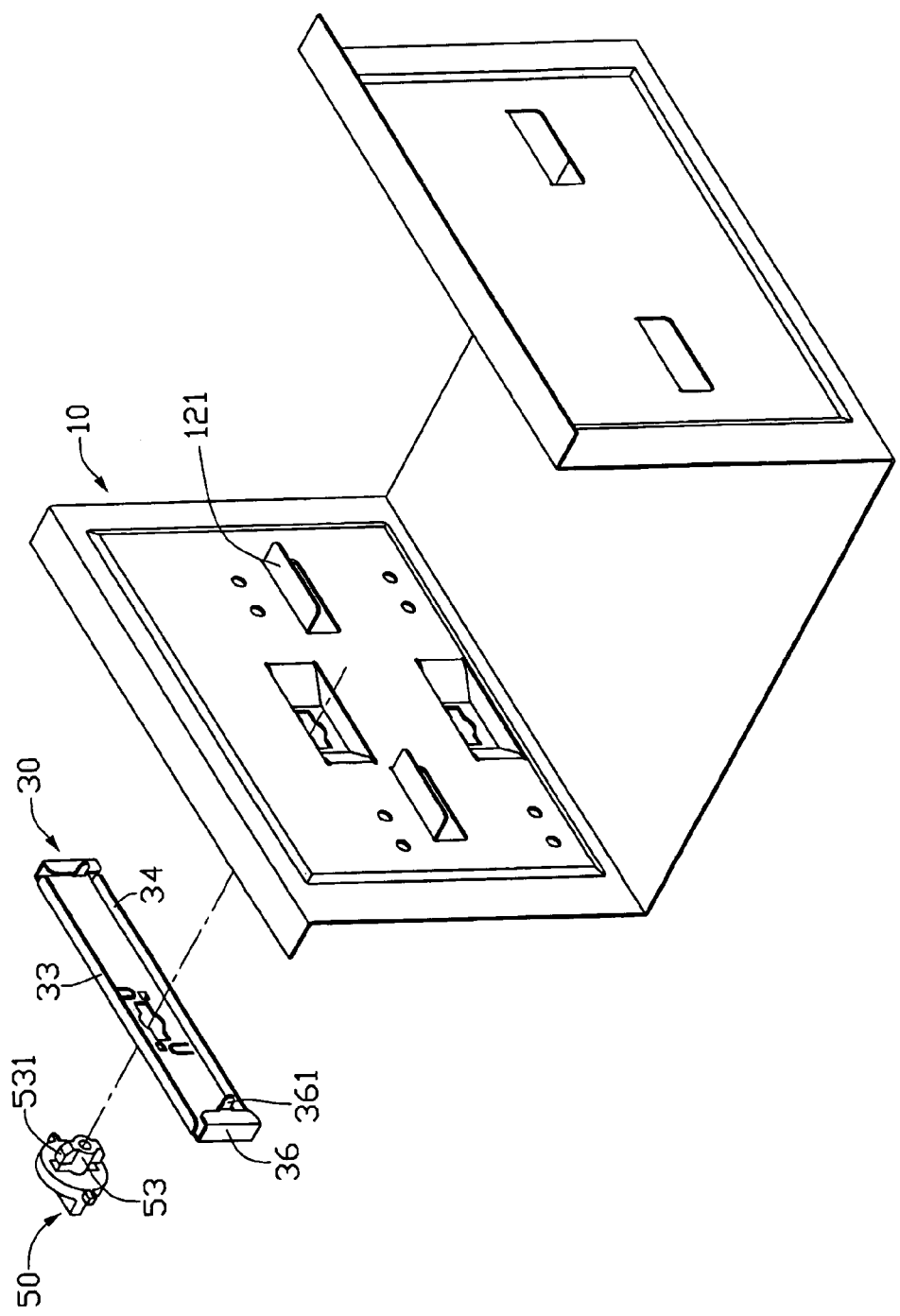
FIG. 2 is similar to FIG. 1, but viewed from another aspect.
Figure 3:
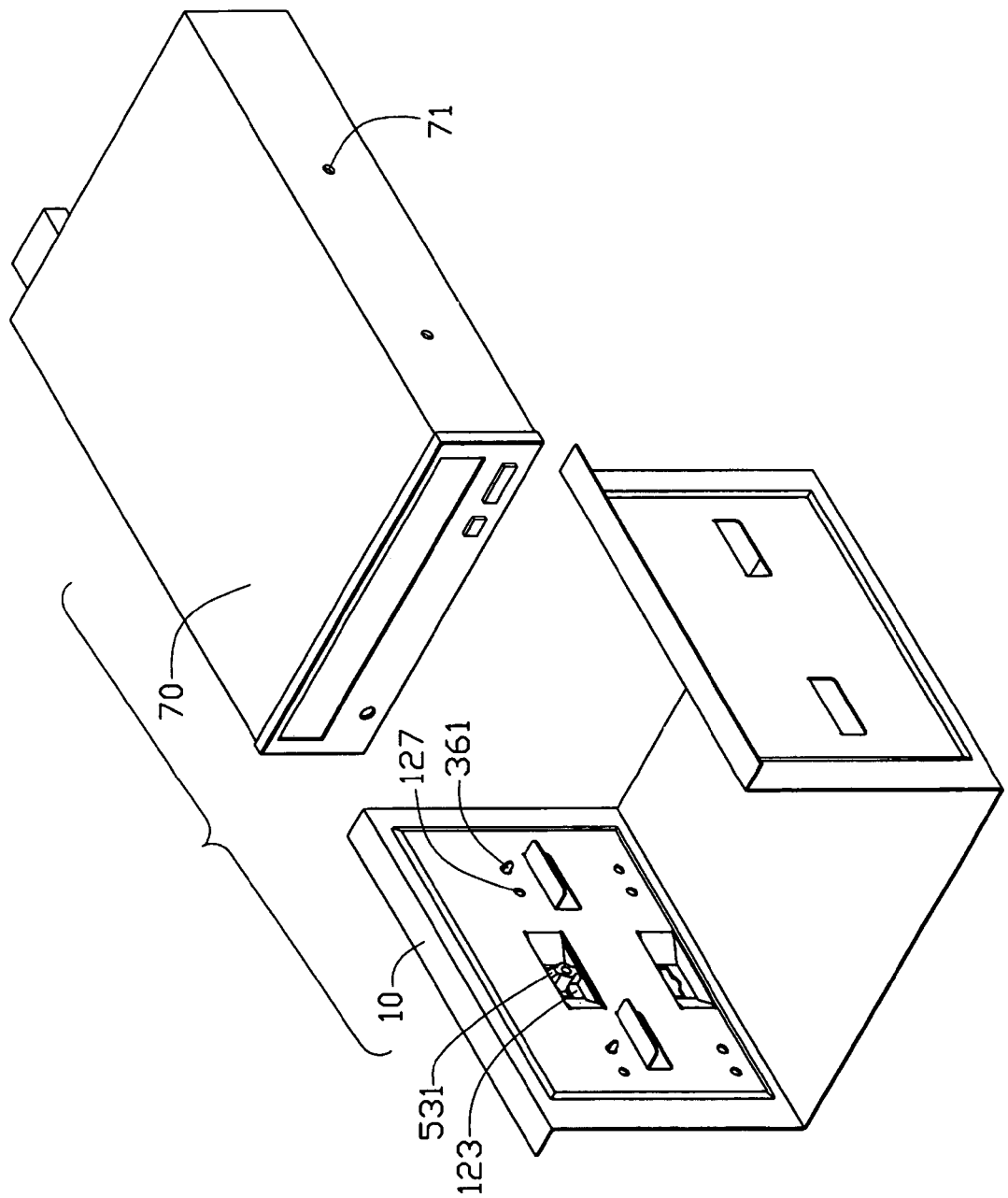
FIG. 3 shows an assembled view of FIG. 2 and a storage device.

Referring to FIGS. 1 to 3, a fixing mechanism of an electronic device like a computer is provided to fix a functional component like a storage device 70 of the electronic device. The fixing mechanism includes a bracket 10 for receiving the storage device 70 therein, a latch member 30 for fixing the storage device 70 in the bracket 10, and a fastener 50 for holding the latch member 30 in place.

The bracket 10 includes a bottom wall 11 and a pair of opposite parallel sidewalls 12, 14 extending upwardly from opposite edges of the bottom wall 11 respectively. A pair of spaced supporting plates 121 is stamped inwardly from the sidewall 12, and a pair of spaced supporting plates 141 is stamped inwardly from the sidewall 14. The storage device 70 can be selectively placed on the supporting plates 121, 141 or on the bottom wall 11. Two vertically spaced seats 123 are stamped outwardly from the sidewall 12 respectively adjacent the supporting plates 121 and the bottom wall 11, thereby the sidewall 12 defining a cavity adjoining each seat 123. Each seat 123 defines a first aperture 1231, the first aperture 1231 including a circular portion and two opposite rectangle portions in communication with the circular portion. A first set of holes, which includes two first holes 125, is defined in the sidewall 12 adjacent each seat 123, and the seat 123 is generally located between the first holes 125. A second set of holes, which includes two second holes 127, is defined in the sidewall 12 and spaced apart from the first set of holes by a predetermined distance. A distance between the first holes 125 is same with a distance between the second holes 127.

The latch member 30 includes a plate 31, upper and lower flanges 33, 34 extending from upper and lower edges of the plate 31 respectively, and two L-shaped bent portions 36 bent from opposite ends of the plate 31. A latch 361 is formed at each bent portion 36, for engaging the storage device 70. A second aperture 37 is defined in the plate 31, and the second aperture 37 is dimensioned in accordance with the first aperture 1231. Two elastic clips 38 are diagonally formed adjacent the second aperture 37, each clip 38 including a convex 381 formed at a free end thereof. Two protrusions 39 are diagonally formed adjacent the second aperture 37, for cooperating with the clips 38 respectively.

The fastener 50 includes a cylindrical body 51. A knob 52 is formed on a first end of the body 51, for facilitating manipulating the fastener 50. Two projections 511 project from an external surface of the body 51 in opposite directions, corresponding to the clips 38 and the protrusions 39 of the latch member 30. A rod 53 is extended from a second end of the body 51 corresponding to the circular portion of the first aperture 1231 of each seat 123, and two blocks 531 are arranged adjacent a free end of the rod 53 corresponding to the rectangle portions of the first aperture 1231.

Figure 4:
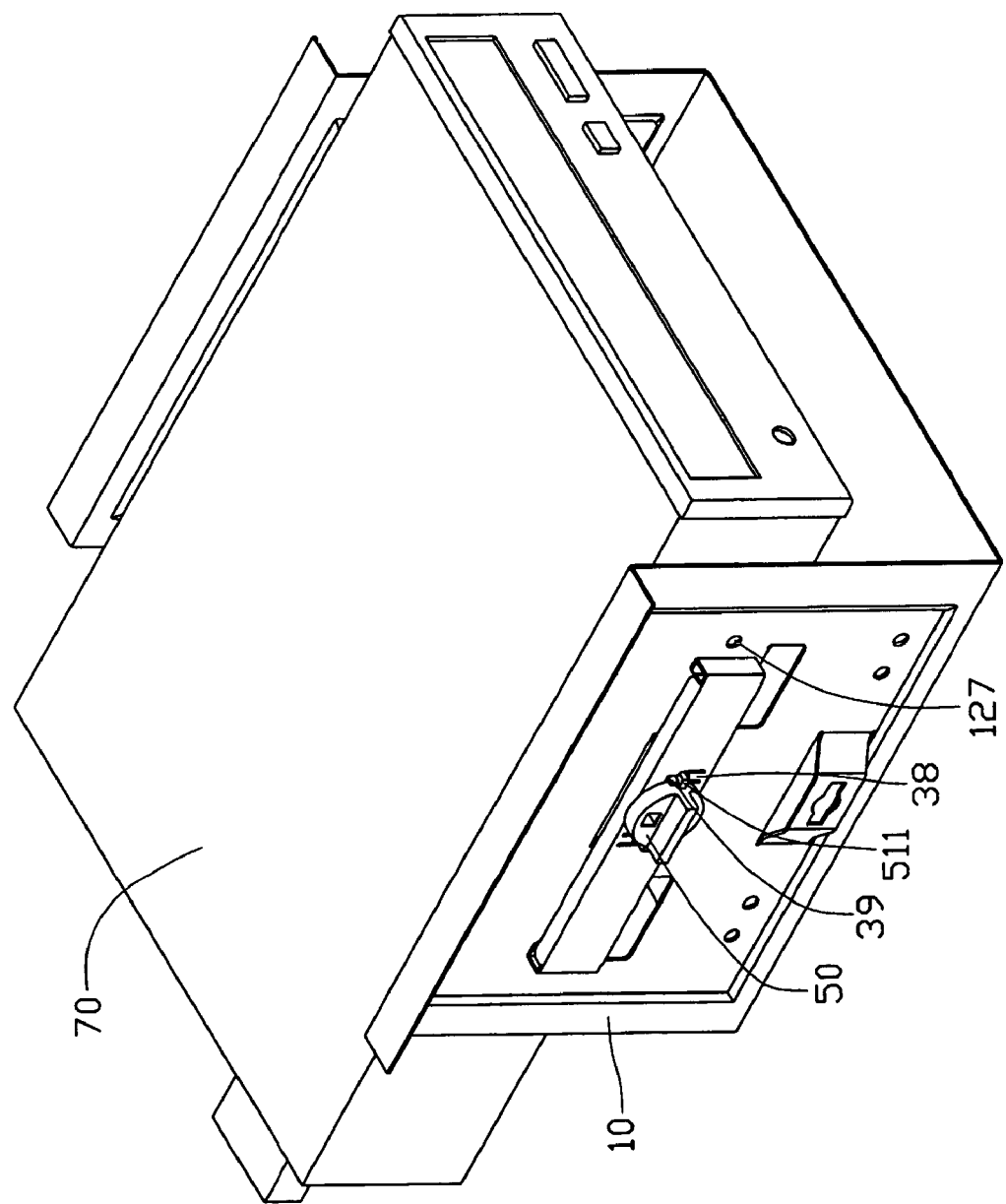
FIGS. 4 and 5 are assembled views of FIG. 3, but viewed from another aspect, showing the storage device is at a first position.

Referring to FIGS. 3 and 4, in use, the storage device 70 is placed on the supporting places 121, 141 of the bracket 10, and a pair of retaining holes 71 defined in the storage device 70 aligns with the first set of holes 125 of the sidewall 12 of the bracket 10 respectively. The latch member 30 is positioned relative to the sidewall 12 of the bracket 10, with the latches 361 extended through the first holes 125 and engaged in the retaining holes 71 respectively. The second aperture 37 of the latch member 30 is in alignment with the first aperture 1231 of the seat 123 of the sidewall 12. The rod 53 of the fastener 50 is inserted through the second and first apertures 37, 1231 in sequence, until the blocks 531 of the rod 53 enter the cavity of the sidewall 12. The fastener 50 is rotated by the knob 52, the projections 511 of the fastener 50 urge the clips 38 of the latch member 30 respectively toward the sidewall 12, the projections 511 get over the convexes 381 of the clips 38 respectively and are stopped by the protrusions 39 respectively. The blocks 531 of the rod 53 of the fastener 50 is rotated away from the rectangle portions of the first aperture 1231 to engage the seat 123 adjacent the circular portion of the first aperture 1231. The latch member 30 is thus retained to the sidewall 12 by the fastener 50. The storage device 70 is thereby fixed in the bracket 10 at a first position.

Figure 5:
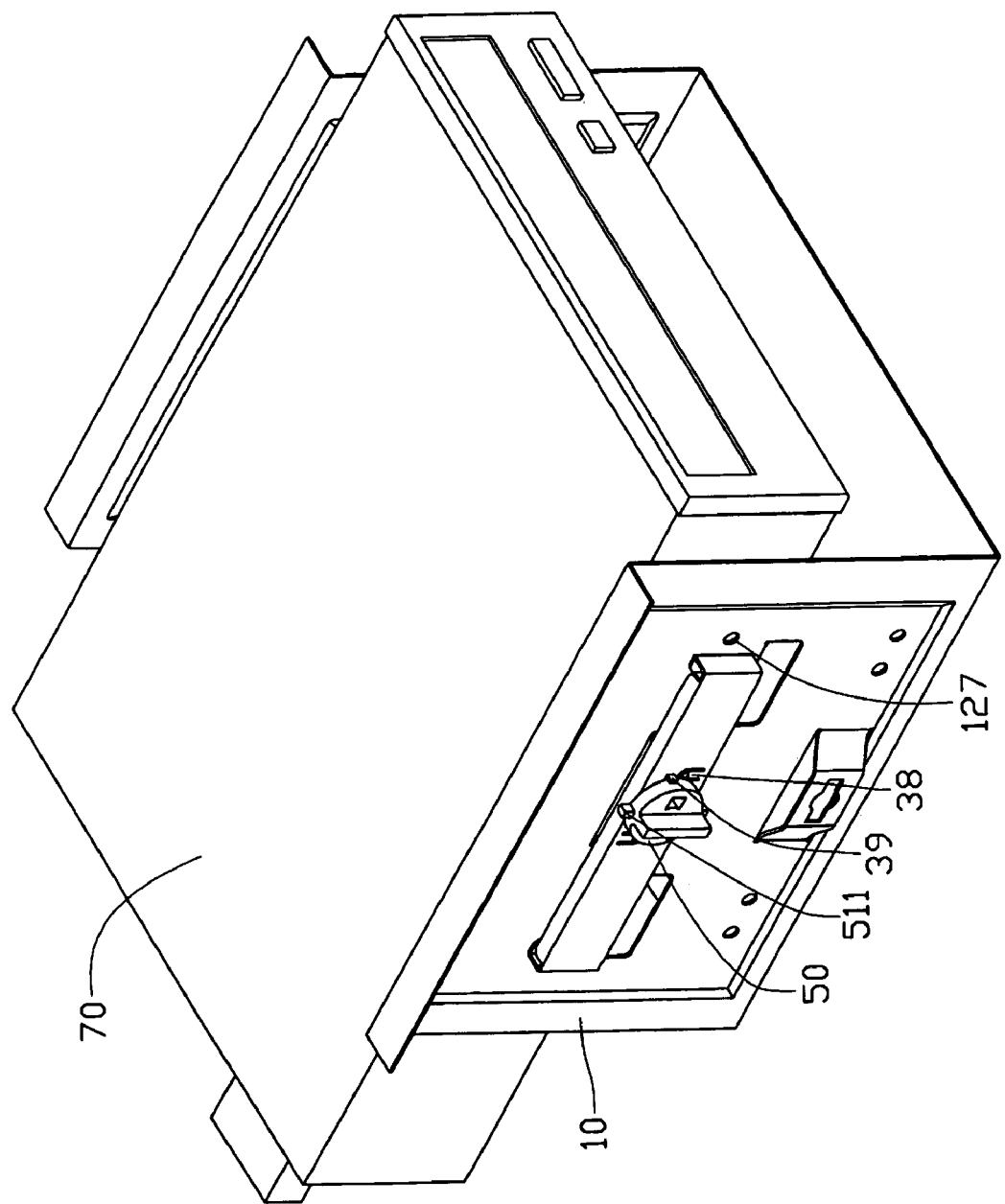
Figure 6:
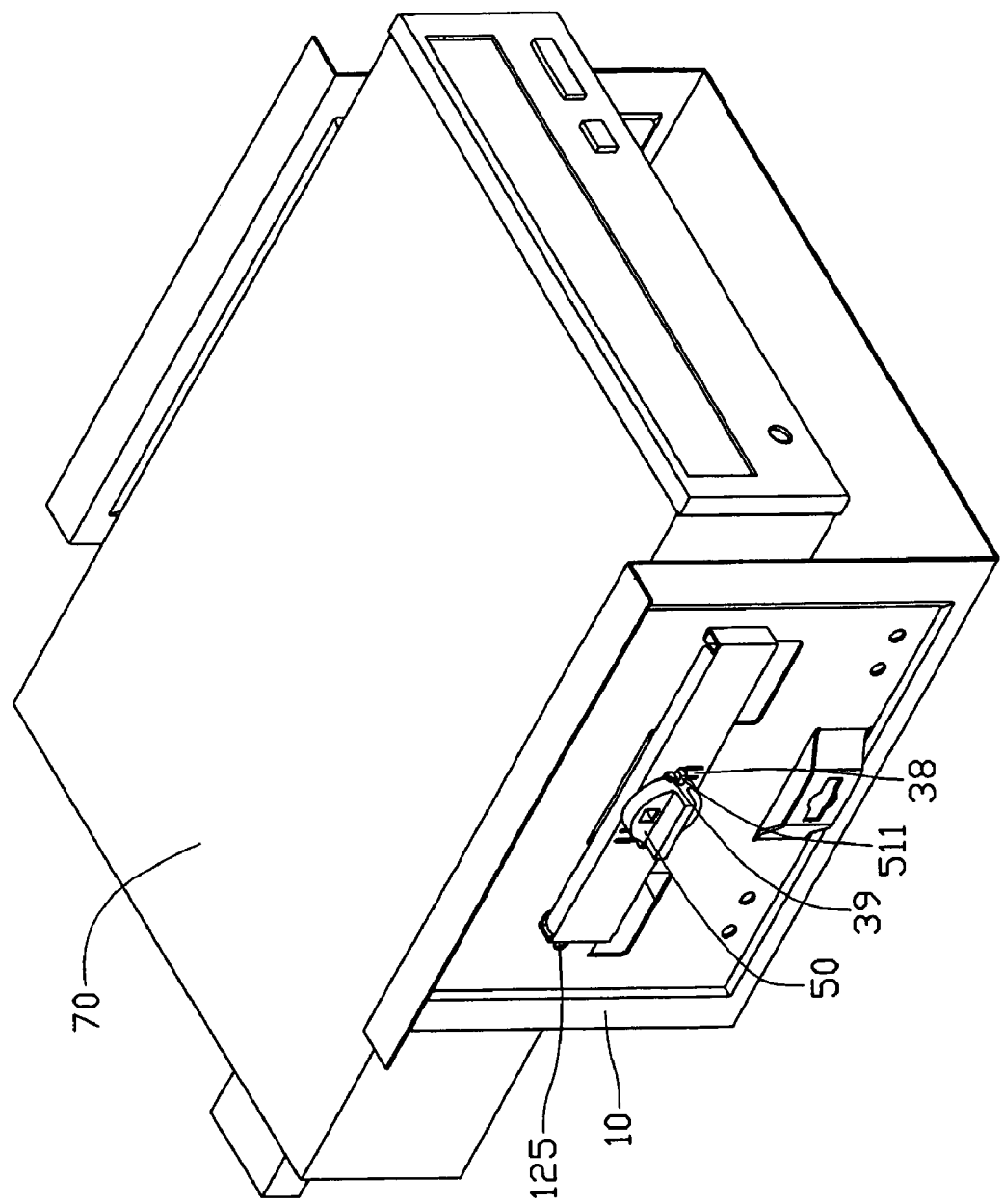
FIG. 6 is similar to FIG. 4, showing the storage is fixed at a second position.

Referring to FIG. 5, to change fixing position of the storage device 70, the fastener 50 is reversely rotated to disengage the projections 511 from between the clips 38 and the protrusions 39 of the latch member 30 respectively, and the blocks 531 of the rod 53 is reversely rotated to align with the rectangle portions of the first aperture 1231 of the seat 123 respectively allowing the rod 53 to be withdrawn from the first aperture 1231. The fastener 50 together with the latch member 30 is then detached from the sidewall 12 of the bracket 10. Referring to FIG. 6, the storage device 70 is then moved to a second position inside the bracket 10 with the retaining holes 71 in alignment with the second set of holes 127 of the sidewall 12. The latch member 30 is turned 180 degrees around the rod 53 of the fastener 50 and positioned to the sidewall 12, the latches 361 are extended through the second set of holes 127 and engaged in the retaining holes 71 of the storage device 70. The fastener 50 is then inserted through the sidewall 12 to attach the latch member 30 to the sidewall 12, thereby fixing the storage device 70 in the bracket 10.

It is believed that the present embodiment and its advantages will be understood from the foregoing description, and it will be apparent that various changes may be made thereto without departing from the spirit and scope of the invention or sacrificing all of its material advantages, the embodiment and examples hereinbefore described merely being one preferred or exemplary embodiment with exemplary detail.

What is claimed is:

1. A fixing mechanism comprising:
    a bracket for receiving a storage device, the bracket comprising a sidewall, a first aperture and spaced first and second sets of holes being defined in the sidewall, the first set of holes comprising a first hole and a second hole respectively located at opposite sides of the first aperture, the second set of holes comprising a third hole and a fourth hole respectively located at opposite sides of the first aperture, the first and fourth holes located at a same side of the first aperture, the second and third holes located at an opposite side of the first aperture, the distance between the first hole and the first aperture is different from the distance between the second hole and the first aperture, the distance between the third hole and the first aperture is same as the distance between the first hole and the first aperture, the distance between the fourth hole and the first aperture is same as the distance between the second hole and the first aperture;
    a latch member comprising first and second latches, the first latch being extended through the first hole of the first set of holes and the second latch being extended through the second hole of the first set of holes for engaging the storage device at a first position; and
    a fastener detachably attaching the latch member to the sidewall, the first latch being extended through the third hole of the second set of holes and the second latch being extended through the fourth hole of the second set of holes with the precondition that positions of opposite ends of the latch member are exchanged when the fastener is disengaged from the sidewall.

2. The fixing mechanism as claimed in claim 1, wherein the fastener comprises a rod and a pair of opposite blocks arranged on the rod, the first aperture is dimensioned to allow the blocks entering the bracket therethrough and thereafter engaging the inside of the sidewall when the fastener is rotated.

3. The fixing mechanism as claimed in claim 2, wherein a seat is formed outwardly from the sidewall, and the blocks of the fastener engage the seat.

4. The fixing mechanism as claimed in claim 1, wherein the fastener comprises a body, a projection is formed on the body, a clip and a protrusion are formed on the latch member adjacent the second aperture to sandwich the projection of the fastener therebetween for preventing accidental rotation of the fastener.

5. The fixing mechanism as claimed in claim 4, wherein the clip is elastic in construction, and a convex is formed adjacent a free end of the clip in cooperation with the protrusion of the latch member.

6. A fixing mechanism comprising:
    a bracket for receiving a device, the bracket comprising a sidewall;
    a latch member positioned to an external surface of the sidewall for fixing the device; and
    a fastener rotatably engaging an internal surface of the sidewall to detachably attach the latch member to the sidewall, the fastener comprising a body, a projection being formed on the body, an elastic clip and a protrusion being formed on the latch member, a convex portion being formed adjacent a free end of the clip and cooperating with the protrusion of the latch member to sandwich the projection of the fastener therebetween for preventing accidental rotation of the fastener.

7. The fixing mechanism as claimed in claim 6, wherein the sidewall defines two spaced sets of holes, and the latch member comprises a plurality of latches selectively extending through one of the two sets of holes to fix the device at a first or second position.

8. The fixing mechanism as claimed in claim 6, wherein the sidewall defines a first aperture, the latch member defines a second aperture, the fastener is capable of being extended through the second and first apertures and rotated to engage the internal surface of the sidewall.

9. The fixing mechanism as claimed in claim 8, wherein the fastener comprises a rod and a block arranged on the rod, the first aperture of the sidewall is dimensioned to allow the block entering the bracket therethrough and thereafter engaging the internal surface of the sidewall when the fastener is rotated.

10. The fixing mechanism as claimed in claim 9, wherein a seat is formed outwardly from the sidewall, and the block of the fastener engages the seat.

11. An electronic device comprising:
    a bracket formed in said electronic device to provide a space therein, the bracket comprising a sidewall, a first aperture and spaced first and second sets of holes being defined in the sidewall, the first set of holes comprising a first hole and a second hole respectively located at opposite sides of the first aperture, the second set of holes comprising a third hole and a fourth hole respectively located at opposite sides of the first aperture, the first and fourth holes located at a same side of the first aperture, the second and third holes located at an opposite side of the first aperture, the distance between the first hole and the first aperture is different from the distance between the second hole and the first aperture, the distance between the third hole and the first aperture is same as the distance between the first hole and the first aperture, the distance between the fourth hole and the first aperture is same as the distance between the second hole and the first aperture;

a functional component movably installable in said space of said bracket, said functional component defining two holes and capable of being selectively retained in a first position or a second position thereof inside said space relative to said bracket; and a latch member removably attachable to said bracket so as to retain said functional component in said space when said functional component resides in said space, said latch member comprising two latches, when the latches are respectively extended through the first set of holes of the bracket and engaged in the holes of the functional component, the functional component is retained in said first position, when the latches are respectively extended through the second set of holes of the bracket and engaged in the holes of the functional component, the functional component is retained in said second position.

12. The electronic device as claimed in claim 11, further comprising a fastener rotatably engagable with said latch member so as to secure said latch member to said bracket.

* * * * *